United States Patent
Zhang et al.

(10) Patent No.: US 11,567,971 B2
(45) Date of Patent: Jan. 31, 2023

(54) SYSTEMS, METHODS, AND DEVICES FOR STORAGE SHUFFLE ACCELERATION

(71) Applicant: Samsung Electronics Co., Ltd., Suwon-si (KR)

(72) Inventors: Hui Zhang, San Jose, CA (US); Joo Hwan Lee, San Jose, CA (US); Yiqun Zhang, Sunnyvale, CA (US); Armin Haj Aboutalebi, San Jose, CA (US); Xiaodong Zhao, Cupertino, CA (US); Praveen Krishnamoorthy, Fremont, CA (US); Andrew Chang, Los Altos, CA (US); Yang Seok Ki, Palo Alto, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/112,975

(22) Filed: Dec. 4, 2020

(65) Prior Publication Data
US 2022/0156287 A1    May 19, 2022

Related U.S. Application Data

(60) Provisional application No. 63/116,144, filed on Nov. 19, 2020.

(51) Int. Cl.
*G06F 3/06* (2006.01)
*G06F 16/27* (2019.01)
*H04L 67/1097* (2022.01)

(52) U.S. Cl.
CPC ............ *G06F 16/278* (2019.01); *G06F 3/061* (2013.01); *G06F 3/067* (2013.01); *H04L 67/1097* (2013.01)

(58) Field of Classification Search
None
See application file for complete search history.

(56) References Cited

U.S. PATENT DOCUMENTS

| 9,342,564 B2 | 5/2016 | Jung et al. |
| 9,953,003 B2 | 4/2018 | Lavasani |

(Continued)

OTHER PUBLICATIONS

Degani, Yuval, "Accelerating Shuffle: A Tailormade RDMA Solution for Apache Spark", Spark Summit Europe 2017, Oct. 24, 2017, 30 pages.

(Continued)

*Primary Examiner* — Brian R Peugh
(74) *Attorney, Agent, or Firm* — Renaissance IP Law Group LLP

(57) ABSTRACT

A method of processing data in a system having a host and a storage node may include performing a shuffle operation on data stored at the storage node, wherein the shuffle operation may include performing a shuffle write operation, and performing a shuffle read operation, wherein at least a portion of the shuffle operation is performed by an accelerator at the storage node. A method for partitioning data may include sampling, at a device, data from one or more partitions based on a number of samples, transferring the sampled data from the device to a host, determining, at the host, one or more splitters based on the sampled data, communicating the one or more splitters from the host to the device, and partitioning, at the device, data for the one or more partitions based on the one or more splitters.

18 Claims, 9 Drawing Sheets

(56) References Cited

U.S. PATENT DOCUMENTS

| | | |
|---|---|---|
| 10,374,628 B2 | 8/2019 | Abali et al. |
| 10,585,602 B2 | 3/2020 | Yoon et al. |
| 10,642,520 B1 | 5/2020 | Zhao et al. |
| 2013/0013863 A1* | 1/2013 | Cher .................. G06F 12/0848 711/122 |
| 2013/0339649 A1* | 12/2013 | Hsu ..................... G06F 9/30032 711/170 |
| 2018/0068004 A1 | 3/2018 | Lavasani |
| 2020/0159568 A1* | 5/2020 | Goyal .................. G06F 9/4843 |
| 2020/0169268 A1* | 5/2020 | Billa .................... H03M 7/6011 |

OTHER PUBLICATIONS

Mehra, Pankaj, "Samsung SmartSSD: Accelerating Data-Rich Applications", Flash Memory Summit, PowerPoint presentation, Aug. 8, 2019, 9 pages.

Zhang, Haoyu et al., "Riffle: Optimized Shuffle Service for Large-Scale Data Analytics", EuroSys '18: Proceedings of the Thirteenth EuroSys Conference, Apr. 2018, Article No. 43, pp. 1-15.

Zhang, Jian et al., "Spark-PMoF: Accelerating Bigdata Analytics with Persistent Memory over Fabric", Intel, PowerPoint presentation, Mar. 28, 2019, 39 pages.

\* cited by examiner

SYSTEMS, METHODS, AND DEVICES FOR STORAGE SHUFFLE ACCELERATION

CROSS-REFERENCE TO RELATED APPLICATIONS

This application claims priority to, and the benefit of, U.S. Provisional Patent Application Ser. No. 63/116,144 titled "Systems, Methods, and Devices for Storage Shuffle Acceleration" filed Nov. 19, 2020 which is incorporated by reference.

TECHNICAL FIELD

This disclosure relates generally to data shuffle operations, and more specifically to systems, methods, and apparatus for near-storage shuffle acceleration.

BACKGROUND

A system having a host and one or more storage nodes may utilize a shuffle operation, for example, to rearrange data between partitions and/or nodes.

The above information disclosed in this Background section is only for enhancement of understanding of the background of the invention and therefore it may contain information that does not constitute prior art.

SUMMARY

A method of processing data in a system having a host and a storage node may include performing a shuffle operation on data stored at the storage node, wherein the shuffle operation may include performing a shuffle write operation, and performing a shuffle read operation, wherein at least a portion of the shuffle operation is performed by an accelerator at the storage node. The portion of the shuffle operation performed at the storage node may include a portion of the shuffle write operation. The portion of the shuffle write operation may include a partition operation. The portion of the shuffle write operation may include one or more of an aggregation operation, a sort operation, a merge operation, a serialize operation, a compression operation, or a spill operation. The portion of the shuffle operation performed at the storage node may include a portion of the shuffle read operation. The portion of the shuffle read operation may include one or more of a fetching operation, a decompression operation, a deserialize operation, a merge operation, a sort operation, or an aggregation operation. The portion of the shuffle operation performed at the storage node may include a partition operation performed using a peer-to-peer (P2P) connection between an accelerator and a storage device at the storage node. The portion of the shuffle operation performed at the storage node may include a data spill operation performed using a P2P connection between an accelerator and a storage device at the storage node. The portion of the shuffle operation performed at the storage node may include a fetch operation performed using a direct memory access operation. The portion of the shuffle operation performed at the storage node may include a data merge operation performed using a P2P connection between an accelerator and a storage device at the storage node.

A storage node may include a storage device, and an accelerator, wherein the storage node is configured to perform at least a portion of a shuffle operation using the accelerator. The storage node may further include a P2P connection between the storage device and the accelerator, and the storage device and the accelerator may be configured to perform the portion of the shuffle operation by transferring data over the P2P connection. The accelerator may be integral with the storage device. The storage node may include a server. The storage device may be a first storage device, the accelerator may be a first accelerator, the P2P connection may be a first P2P connection, and the storage node may further include a second storage device, a second accelerator, and a second P2P connection between the second storage device and the second accelerator, wherein the second storage device and the second accelerator may be configured to perform the portion of the shuffle operation by transferring data over the second P2P connection. The first and second storage devices may be configured to perform the portion of the shuffle operation by transferring data through a direct memory access operation. The storage node may be configured to perform the portion of the shuffle operation by transferring data to an additional storage node through a remote direct memory access operation.

A method for partitioning data may include sampling, at a device, data from one or more partitions based on a number of samples, transferring the sampled data from the device to a host, determining, at the host, one or more splitters based on the sampled data, communicating the one or more splitters from the host to the device, and partitioning, at the device, data for the one or more partitions based on the one or more splitters. The method may further include determining, at the device, a number of records for the one or more partitions, communicating the number of records for the one or more partitions from the device to the host, determining, at the host, the number of samples for the one or more partitions, and communicating the number of samples from the host to the device. The sampling may be performed by an accelerator at the device.

A system may include a storage node comprising an accelerator, and a host configured to perform a shuffle operation for data stored at the storage node, wherein the shuffle operation may include a shuffle write operation and a shuffle read operation, and the storage node may be configured to perform at least a portion of the shuffle operation using the accelerator.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Some of the inventive principles of this disclosure relate to offloading one or more portions of a shuffle operation from a host to a storage node. For example, one or more portions of a shuffle write and/or shuffle read operation may be performed by an accelerator at a storage node. Depending on the implementation details, this may reduce a processing workload at the host and/or reduce input and/or output (I/O) operations and/or network transfers between the host and one or more components of one or more storage nodes.

Some additional inventive principles of this disclosure relate to the use of a peer-to-peer (P2P) connection between a storage device and an accelerator for one or more portions of a shuffle operation. For example, a P2P connection may transfer data between a storage device and an accelerator for one or more portions of a shuffle write and/or shuffle read operation. Depending on the implementation details, this may reduce I/O operations and/or network transfers between the host and one or more components of one or more storage nodes.

Some additional inventive principles of this disclosure relate to the use of one or more types of direct memory access (DMA) operations for one or more portions of a shuffle operation. For example, a DMA or remote DMA (RDMA) operation may be used to transfer data between storage devices within a node or between different nodes. Depending on the implementation details, this may reduce I/O operations and/or network transfers between nodes and/or between storage devices within a node.

The principles disclosed herein may have independent utility and may be embodied individually, and not every embodiment may utilize every principle. Moreover, the principles may also be embodied in various combinations, some of which may amplify the benefits of the individual principles in a synergistic manner.

Shuffle Operations

In some embodiments, a shuffle operation may be used to rearrange data between partitions, devices, and/or nodes in a distributed data processing framework. This may be helpful, for example, when a transformation involves data from other partitions such as summing values in a column.

Figure 1:
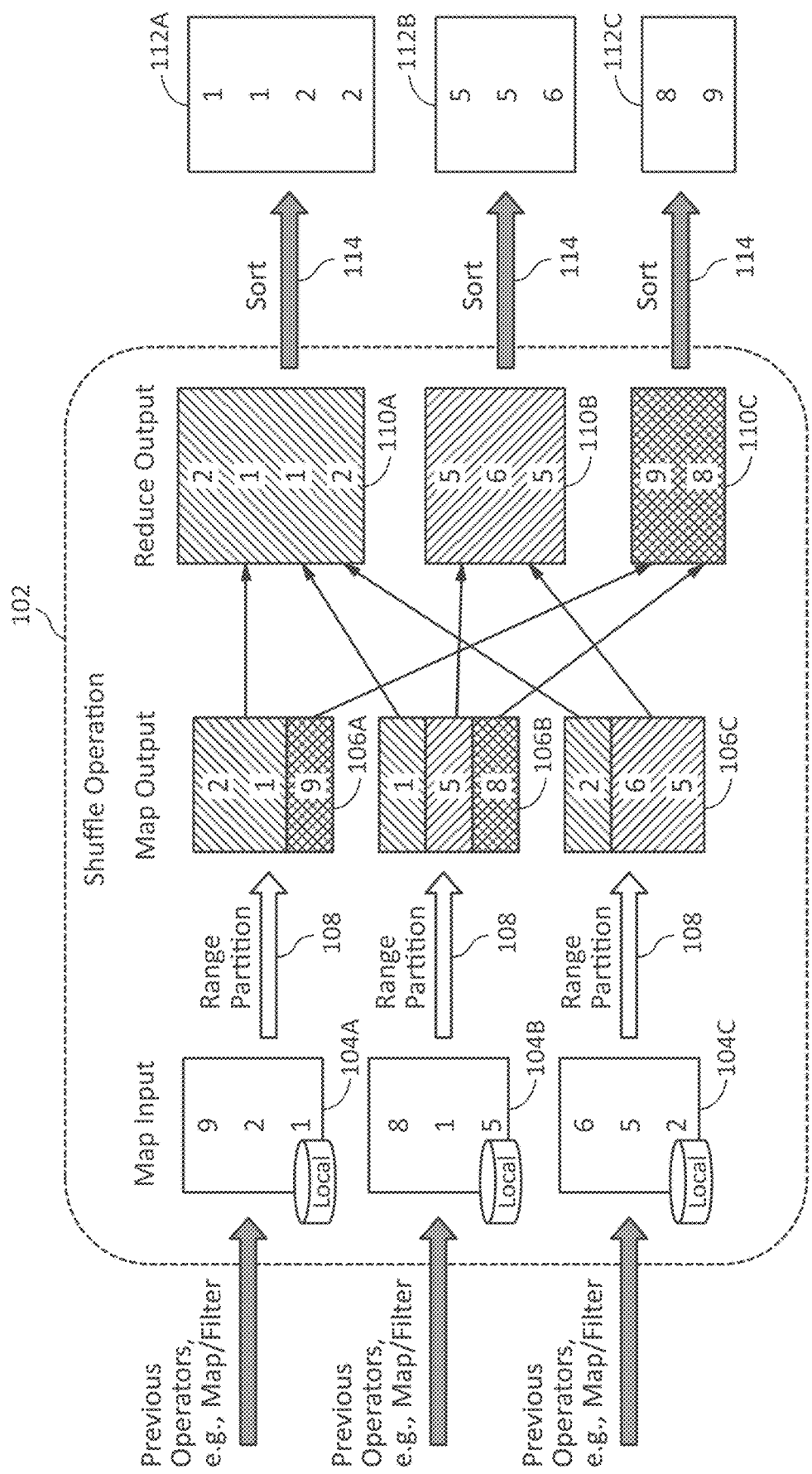
FIG. 1 illustrates an embodiment of a shuffle operation for a distributed data processing framework.

FIG. 1 illustrates an embodiment of a shuffle operation for a distributed data processing framework. The shuffle operation 102 may include at least two parts: a map task and a reduce task. One or more map tasks may receive chunks of collocated data 104A, 104B, and 104C (collectively 104), for example, from one or more previous operators such as a map operator, a filter operator, and/or the like. The map task may partition the received data into different blocks 106A, 106B, and 106C (collectively 106) based on one or more partitioning rules such as range partitioning, list partitioning, and/or the like. In the embodiment illustrated in FIG. 1, a partitioning rule may be implemented as range partitioning 108. Thus, the inputs, which in this embodiment may be numerical values, may be assigned to different partitions that may be indicated by different types of shading in portions of the blocks 106. The map task may then concatenate the different blocks 106 into a file and write (e.g., persist) the file into local storage as an intermediate map output.

In a reduce part of the shuffle operation, 102 one or more reduce tasks may request (e.g., read) blocks from the intermediate map output to constitute a specific partition. Thus, entries from different input chunks that have been assigned to the same partition may be gathered into the same reduce output block 110A, 110B, or 110C (collectively 110), which may now be coextensive with partitions, as shown by the different types of shading in FIG. 1. After the shuffle operation 102, data may have been exchanged such that one or more post-shuffle operations (e.g., sort) may continue with further execution on one or more of the reduce-side partitions 110. In some embodiments, the shuffle operation 102 may ensure the inter-partition ordering and/or indirectly ensure or guarantee the global ordering of the dataset which may include blocks 112A, 112B, and 112C (collectively 112), for example, after one or more sort operations 114.

Although the embodiment illustrated in FIG. 1 may be illustrated with three each of the input chunks 104, map output blocks 106, and reduce output blocks (e.g., partitions) 110, any number of blocks may be used at any stage of the shuffle operation 102. For example, in some embodiments, if a range partition rule specifies 100 ranges, there may be 100 reduce output blocks 110.

In some embodiments, the shuffle operation 102 may be implemented with at least a shuffle write operation and a shuffle read operation. A shuffle write operation may be performed, for example, by a map task which may rearrange input data into one or more blocks that may include entries belonging to different partitions. The shuffle write operation may write these blocks to local storage as the intermediate map output. A shuffle read operation may be performed, for example, by a reduce task which may obtain a map status that has been logged to a driver by the shuffle write operation. The map status may indicate which blocks of the intermediate map output may contain data entries for each partition. The reduce task may fetch one or more blocks of the intermediate output, or portions thereof, based on the map status. If any of the blocks are located at a different node, the reduce task may fetch those blocks, or portions thereof, across a network.

Figure 2:
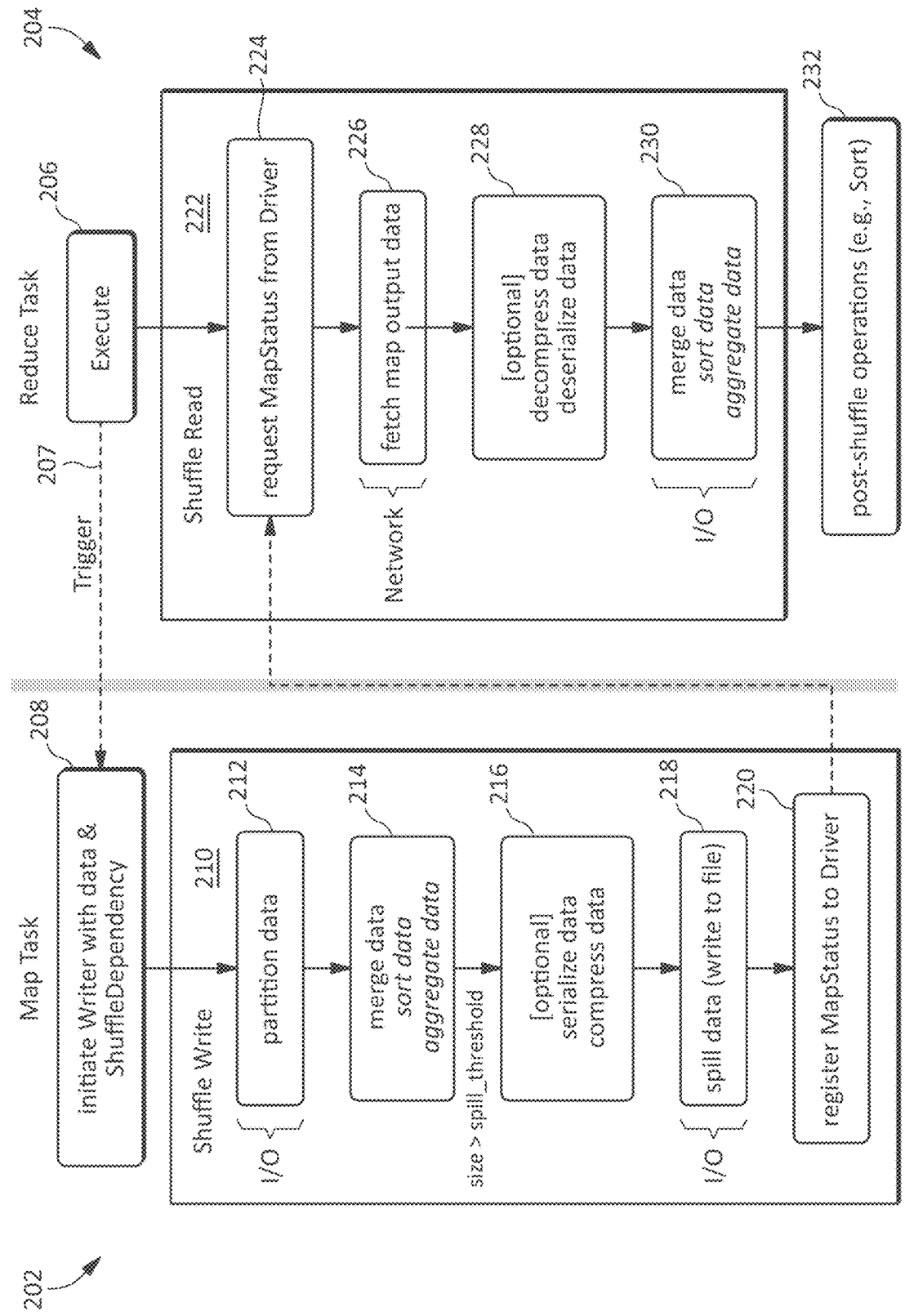
FIG. 2 illustrates an embodiment of a shuffle architecture for a distributed data processing framework.

FIG. 2 illustrates an embodiment of a shuffle architecture for a distributed data processing framework. In the embodiment illustrated in FIG. 2, a map task 202 (which may also be referred to as a mapper) is illustrated generally on the left side of the figure, and a reduce task 204 (which may also be referred to as a reducer) is illustrated generally on the right side of the figure and conceptually separated by the shaded bar down the middle of the figure. In some embodiments, essentially all of the processing operations (e.g., computations) may be performed by a central processing unit (CPU).

A shuffle operation may begin when an action in an execute method 206 in the reduce task 204 triggers an initiation operation 208 in the map task 202 as shown by arrow 207. The initiation operation 208 may initiate a shuffle write operation 210 with input data and/or shuffle dependency information.

The shuffle write operation 210 may include a data partition operation 212 in which the CPU may fetch data from one or more storage devices using one or more I/O operations across a Peripheral Component Interconnect Express (PCIe) interconnect. The data partition operation 212 may then partition the input data into one or more blocks by assigning a partition identification (ID) to each entry of the input data according to a partition rule.

A data merge operation 214 may merge data entries belonging to the same partition (e.g., data having the same partition ID) into continuous chunks of map output data. The data merge operation 214 may also sort and/or aggregate the data, for example, depending on one or more shuffle requirements.

When the amount of processed data reaches a spill threshold, the shuffle write operation 210 may initiate a data spill sequence. In some embodiments, the data spill sequence may include a data serialize and/or data compression operation 216 which may reduce the amount of map output data that is transferred through an I/O operation. Then, in a data spill operation 218, the CPU may write the map output data to one or more files in local storage using one or more I/O operations. At operation 220, the CPU may register map status data, which may include metadata for the map output data, with a driver for the distributed data processing framework. The driver may publish the map status data for use throughout the framework.

The execute method 206 in the reduce task 204 may also initiate a shuffle read operation 222 in which the CPU may request the map status from the driver at operation 224. During a fetch operation 226, the CPU may then use the map status to fetch one or more blocks, for example, for each partition. If the CPU and input data are located at different nodes, the CPU may fetch the data through a network and/or network protocol such as Ethernet and/or Transmission Control Protocol/Internet Protocol (TCP/IP). In some embodiments, the shuffle read operation 222 may include a data decompression and/or data deserialize operation 228 in which the CPU may transform the received data to its original form.

During a data merge operation 230, the CPU may merge data entries belonging to the same partition into continuous chunks of reduce output data which the CPU may then write to local storage through one or more I/O operations. In some embodiments, the data merge operation 230 may also sort and/or aggregate the data, for example, depending on one or more shuffle requirements. The reduce task 204 may then proceed with one or more post-shuffle operations 232 such as a sort operation.

As illustrated in FIGS. 1 and 2, in some embodiments, a shuffle operation may involve one or more CPU-intensive operations such as serialize/deserialize, compress/decompress, sorting and/or merging operations. A shuffle operation may also involve heavy I/O operations and/or network transfers of many small fragmented files. Moreover, a partition operation such as operation 212 may involve additional CPU-intensive sampling operations and/or additional fragmented I/O operations, for example, when data is too large to fit in memory. Additionally, when data is written to and/or read from a storage device, and/or transferred across a network during a shuffle operation, it may halt the ability of a distributed data processing framework to perform other processing. Thus, a shuffle operation may cause a performance bottleneck, especially in large-data, shuffle-intensive applications. Furthermore, shuffle operations may cause stress on a CPU, memory, storage devices, and/or network capacities of one or more devices and/or clusters running a distributed data processing framework.

In some embodiments, it may be beneficial to reduce the number of shuffle operations that are performed or reduce the amount of data that is transferred during a shuffle operation. However, shuffling data in a many-to-many fashion across a network may be non-trivial. In some embodiments, all or most of an entire working set, which may be a large fraction of the input data, may be transferred across the network. This may place a significant burden on an operating system (OS) at the source and/or the destination, for example, by requiring many file and/or network I/O operations.

Shuffle Acceleration

In some embodiments according to this disclosure, one or more portions of a shuffle operation may be offloaded to an accelerator at a storage node.

Figure 3:
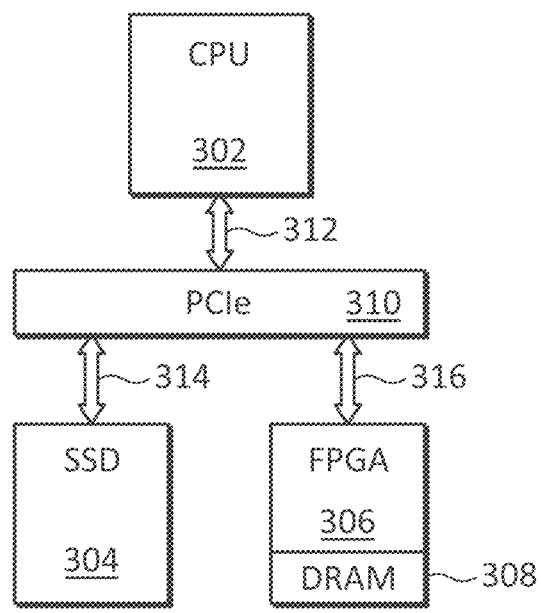
FIG. 3 illustrates an embodiment of a system for implementing shuffle acceleration according to this disclosure.

FIG. 3 illustrates an embodiment of a system for implementing shuffle acceleration according to this disclosure. The embodiment illustrated in FIG. 3 may include a CPU 302, a solid state drive (SSD) 304, a field programmable gate array (FPGA) 306, a dynamic random access memory (DRAM) 308, a PCIe switch 310, and PCIe links 312, 314, and 316. The PCIe topology illustrated in FIG. 3 may be configured so the SSD 304 and the FPGA 306 appear as endpoints to the host CPU 302. Thus, the CPU 302 may be responsible for transferring data between the SSD 304 and the FPGA 306, as well as the DRAM 308 for the FPGA 306.

If the system illustrated in FIG. 3 is used to implement a shuffle operation such as the one illustrated in FIG. 2, one or more processing portions of the shuffle write operation 210 and/or the shuffle read operation 222 may be offloaded to the FPGA 306. For example, one or more portions of the partition operation 212, merge operations 214 and 230, serialize/deserialize and/or compress/decompress operations 216 and 228, data spill operation 218 and/or fetch operation 226 may be offloaded to the FPGA 306. Depending on the implementation details, offloading processing for one or more portions of these operations may reduce clock cycles consumed by the CPU 302. However, offloading operations to the FPGA 306 may also involve transferring data to and from the FPGA 306 and DRAM 308 through the CPU 302. This may increase the cost of communication between the components which may impose a latency and/or throughput limitation on the system. Moreover, if multiple SSDs and/or FPGAs are added to the system, the CPU 302 may lack the ability to scale the communications with the SSDs and/or FPGAs due to high CPU overhead and/or limited PCIe bandwidth.

Some embodiments according to this disclosure may include a P2P connection, which may be implemented as a private connection, between one or more storage devices and one or more accelerators.

Figure 4:
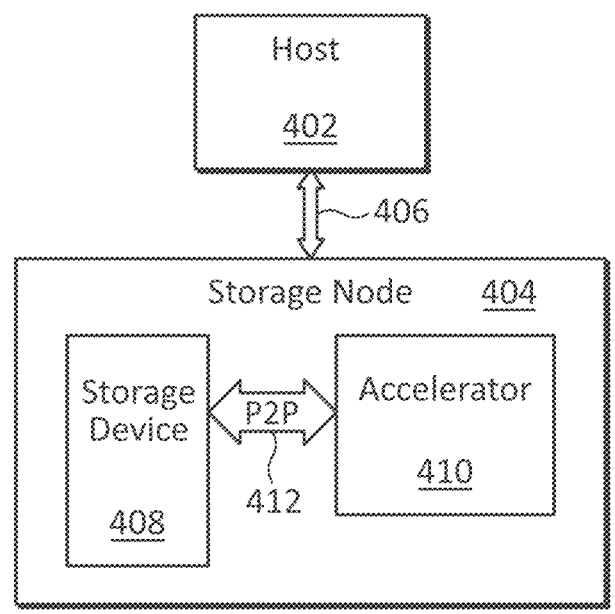
FIG. 4 illustrates an embodiment of a shuffle acceleration system having a P2P connection according to this disclosure.

FIG. 4 illustrates an embodiment of a shuffle acceleration system having a P2P connection according to this disclosure. The embodiment illustrated in FIG. 4 may include a host 402, a storage node 404, and a communication interface 406. The storage node 404 may include a storage device 408, an accelerator 410, and a P2P connection 412.

The use of a P2P connection such as that illustrated in FIG. 4 may enable an accelerator to directly access data in one or more storage devices, thereby conserving limited bandwidth on the connection between the CPU and a storage device, and the connection between the CPU and an accelerator. Depending on the implementations details, a P2P connection may increase the bandwidth and/or reduce overhead, memory usage, and/or power consumption associated with transferring data between a storage device and an accelerator compared to transferring data through the host and/or host memory. In some embodiments, a P2P connection may be especially helpful for shuffle acceleration operations which may involve migrating data between an accelerator and a storage device multiple times.

In some embodiments, and depending on the implementation details, implementing computations at, or close to, a storage device (e.g., through the use of an accelerator) may reduce the cost and/or power of I/O operations. It may also increase system scalability, for example, in the context of managing larger storage systems. However, scalability in larger storage systems with multiple storage devices such as SSDs may be limited, for example, by the capacity of host memory and/or CPU overhead involved with reading and/or writing data and/or sharing connection bandwidth. In some embodiments, and depending on the implementation details, a shuffle acceleration technique using P2P communications as disclosed herein may increase the system scalability by removing or mitigating one or more of these bottlenecks.

Referring again to FIG. 4, the communication interface 406 may provide a first communication connection between the host 402 and the storage device 408, and a second communication connection between the host 402 and the accelerator 410. In some embodiments, the first and second communication connections may be implemented through separate physical and logical connections. In some embodiments, the first and second communication connections may be implemented through physical and/or logical connections that may be partially or entirely combined. For example, the storage node 404 may include a physical switch that may implement the first and second communication connections as partially separate physical connections. As another example, the first and second communication connections may be implemented as separate logical or virtual connections on a combined physical connection.

The communication interface 406 may be implemented with any type of communication structure and/or protocol. For example, the communication interface 406 may be implemented entirely or partially with an interconnect structure and/or protocol such as PCIe, Compute Express Link (CXL), Cache Coherent Interconnect for Accelerators (CCIX), and/or the like. As another example, the communication interface 406 may be implemented entirely or partially with a network structure and/or protocol such as Ethernet, TCP/IP, Fibre Channel, InfiniBand, and/or the like. As a further example, the communication interface 406 may be implemented entirely or partially with a storage interface and/or protocol such as Serial ATA (SATA), Serial Attached SCSI (SAS), Non-Volatile Memory Express (NVMe), and/or the like. Moreover, any of these structures, protocols, and/or interfaces may be combined in hybrid combinations such as NVMe over fabric (NVMe-oF).

The P2P connection 412 may be implemented with any type of communication structure and/or protocol such as the interconnect, network, and/or storage interfaces described above. In some embodiments, the P2P connection 412 may be implemented entirely or partially as a separate logical or virtual connection on a shared physical connection that may be used to implement the communication interface 406.

The host 402 may be implemented with any type of processing apparatus. Examples may include one or more general or special purpose CPUs including complex instruction set computer (CISC) and/or reduced instruction set computer (RISC) processors, and/or the like, as well as FPGAs, application specific integrated circuits (ASICs), systems on chip (SOCs), and/or any other components that may perform the functions of a host processor for a distributed data processing framework such as Apache Spark, Apache Hadoop, and/or the like.

The storage device 408 may be implemented with any type of storage device such as a hard disk drive (HDD), an SSD, persistent storage such as cross-gridded memory with bulk resistance change, and/or the like.

The accelerator 410 may be implemented with any type of processing apparatus including one or more CISC and/or RISC processors, FPGAs, ASICs, SOCs, and/or graphics processing units (GPUs), as well as any combinational logic, sequential logic, timers, counters, registers, gate arrays, complex programmable logic devices (CPLDs), state machines, and/or the like. In some embodiments, the accelerator may be implemented as part of a storage controller for the storage device 408. In some embodiments, one or more memories such as DRAMs may be provided for, or integral with, the accelerator 410 to provide workspace memory for one or more portions of a shuffle operation that may be offloaded to the accelerator 410.

In some embodiments, the accelerator 410 may implement some or all of the offloaded shuffle operations primarily in software, for example, running on a general or special purpose CPU. In some embodiments, the accelerator 410 may implement some or all of the offloaded shuffle operations primarily in hardware. For example, one or more offloaded shuffle operations may be implemented in dedicated logic on an ASIC. As another example, one or more offloaded shuffle operations may be programmed into an FPGA. Depending on the implementation details, implementing offloaded shuffle operations in hardware may provide increased throughput, reduced latency, reduced memory usage, and/or reduced power consumption.

Although shown as a separate component, the host 402 may be implemented integral with the node 404. Similarly, although shown integral with the node 404, the storage device 408 and/or accelerator 410 may be implemented separate from the node 404. In some embodiments, the accelerator 410 may be integral with the storage device 408.

The embodiment illustrated in FIG. 4 may be implemented in any physical configuration. For example, in some embodiments, the system may be implemented as a server chassis in which the host 402, storage device 408, and accelerator 410 are implemented as separate components, and the communication interface 406 and P2P connection 412 may be implemented via PCIe links through a backplane, midplane, and/or the like. In such a configuration, the first communication connection between the host 402 and the storage device 408 may be implemented as a first point-to-point PCIe link, the second communication connection between the host 402 and the accelerator 410 may be implemented as a second point-to-point PCIe link, and the P2P connection 412 may be implemented as a third point-to-point PCIe link. Alternatively, one or more of the point-to-point PCIe links may be combined through one or more PCIe switches.

In another example physical configuration, the storage node 404 may be implemented as a server chassis containing the storage device 408 and the accelerator 410, while the host 402 may be implemented in a separate chassis or rack, or in a remote location. In this configuration, the communication interface 406 may be implemented with a network structure and/or protocol such as Ethernet and TCP/IP, and the storage device 408 may be implemented as an Ethernet SSD (eSSD). Additionally, in this configuration, a network switch may be provided on a backplane, midplane, switchboard, and/or the like, to provide connectivity between the storage device 408 and the host 402 and/or between the accelerator 410 and the host 402. In this configuration, the P2P connection 412 may be implemented, for example, through a point-to-point PCIe, or through a PCIe switch on a backplane, midplane, switchboard, and/or the like. Alternatively, or additionally, the P2P connection may be implemented as a logical connection through a network switch as described above.

Figure 5:
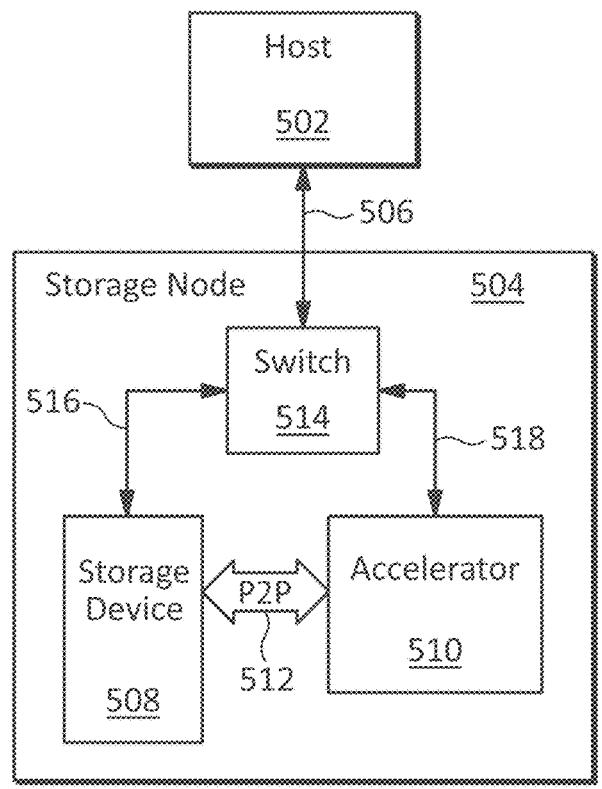
FIG. 5 illustrates an example embodiment of a shuffle acceleration system having a P2P connection according to this disclosure.

FIG. 5 illustrates an example embodiment of a shuffle acceleration system having a P2P connection according to this disclosure. The embodiment illustrated in FIG. 5 may include a host 502, a storage node 504, a communication interface 506 a storage device 508, an accelerator 510, and a P2P connection 512 which may be similar to those illustrated in FIG. 4 and which may be implemented using any of the implementation details disclosed above. However, the embodiment illustrated in FIG. 5 may include a switch 514 which may implement a first communication connection 516 between the host 502 and the storage device 508, and a second communication connection 518 between the host 502 and the accelerator 510. In some embodiments, the switch 514 may be implemented a network switch such as an Ethernet switch, an interconnect switch such as a PCIe switch, and/or the like.

Figure 6:
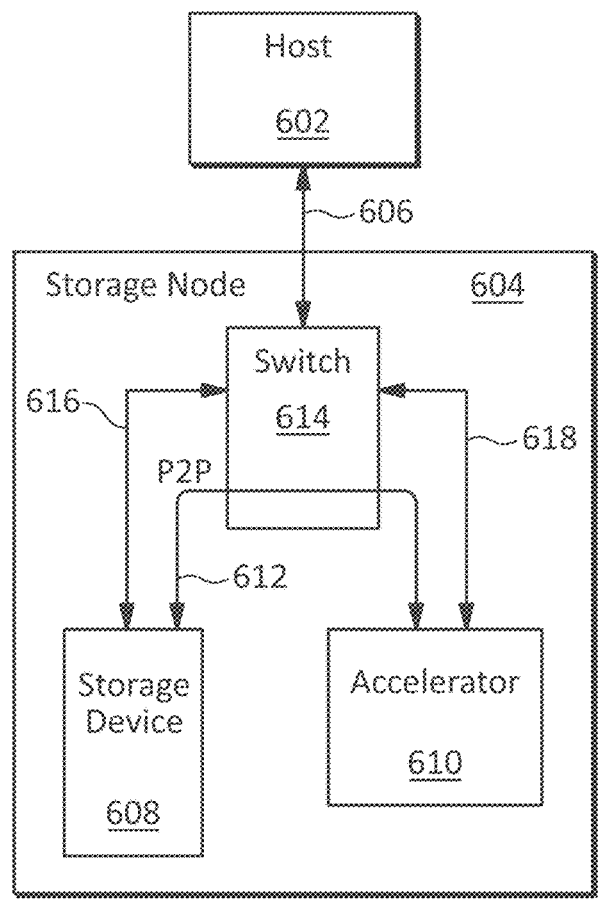
FIG. 6 illustrates another example embodiment of a shuffle acceleration system having a logical P2P connection through a switch according to this disclosure.

FIG. 6 illustrates another example embodiment of a shuffle acceleration system having a logical P2P connection through a switch according to this disclosure. The embodiment illustrated in FIG. 6 may include a host 602, a storage node 604, a communication interface 606 a storage device 608, an accelerator 610, and a switch 614 which may be similar to those illustrated in FIGS. 4 and 5 and which may be implemented using any of the implementation details disclosed above. However, in the embodiment illustrated in FIG. 6, the P2P connection 612 between the storage device 608, and the accelerator 610 may be implemented as a logical connection through the switch 614.

Figure 7:
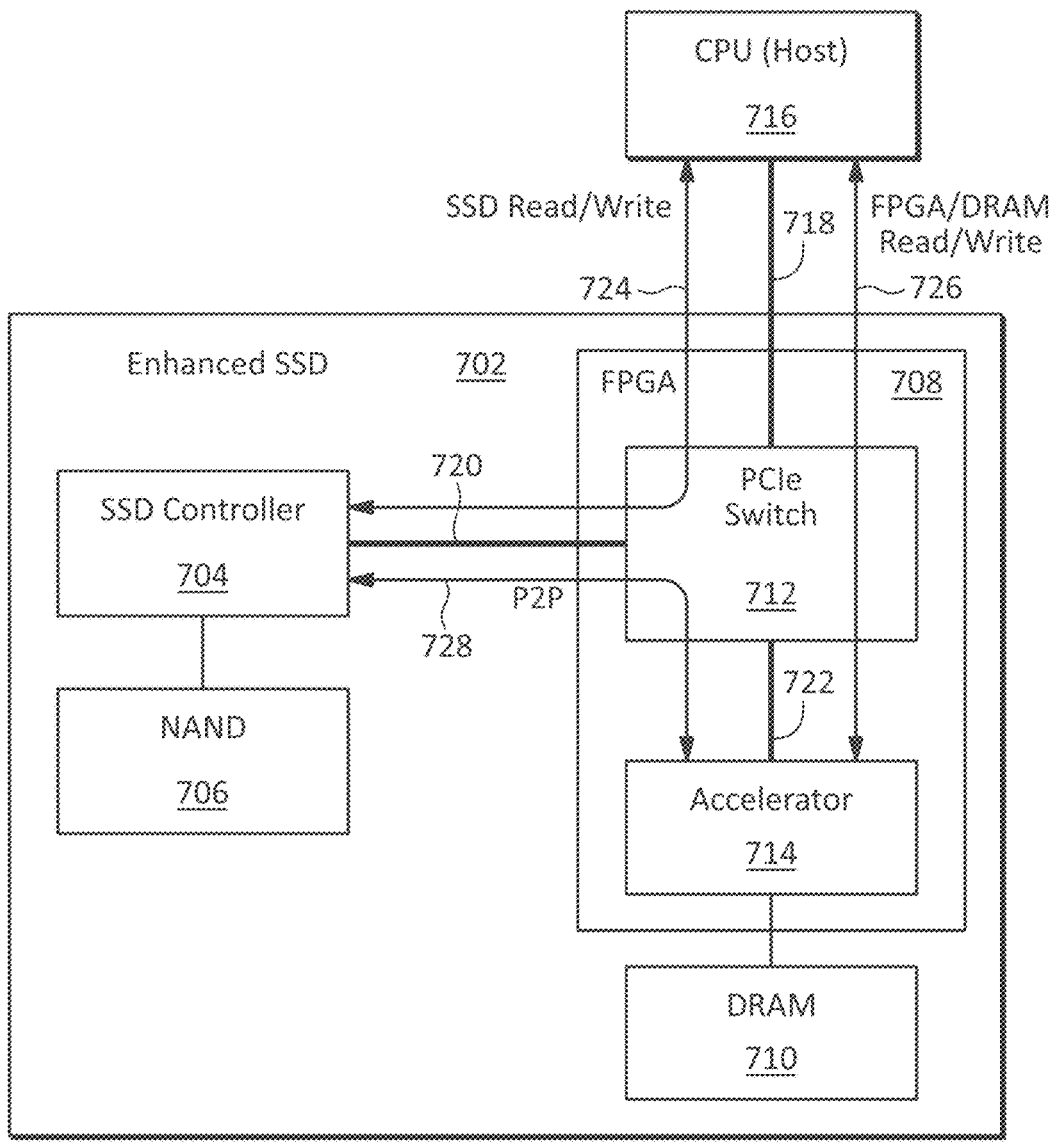
FIG. 7 illustrates another example embodiment of a shuffle acceleration system having a logical P2P connection through a switch that is integral with an accelerator according to this disclosure.

FIG. 7 illustrates another example embodiment of a shuffle acceleration system having a logical P2P connection through a switch that is integral with an accelerator according to this disclosure. For purposes of illustration, the embodiment shown in FIG. 7 may include some specific implementation details such as a PCIe interconnect topology, an FPGA accelerator, and an SSD storage device. In other embodiments, however, these components may be replaced with substitutes such as HDDs, storage drives based on persistent cross-gridded memory with bulk resistance change, and/or the like, interconnect or network interfaces such as CXL, Ethernet, and/or the like, and ASICs, SOCs, and/or the like.

In the embodiment illustrated in FIG. 7, a storage node may be implemented as an enhanced SSD 702 having an SSD controller 704, a not-AND (NAND) flash memory medium 706, an FPGA 708, and a DRAM 710. The FPGA 708 may include a PCIe switch 712 and an accelerator 714. The PCIe switch 712 may be physically connected to a CPU (Host) 716, the SSD controller 704, and the accelerator 714 through PCIe links 718, 720, and 722, respectively. However, the switch 712 may implement logical or virtual connections 724, 726, and 728. Logical connection 724 may handle data read and/or write transfers between the SSD controller 704, which may appear as a separate endpoint, and the host 716. Logical connection 726 may handle data read and/or write transfers between the accelerator 714, which may appear as a separate endpoint, and the host 716. Logical connection 728 may handle P2P communications between the SSD controller 704 and the accelerator 714. In some embodiments, one or more switch functions may be implemented as soft switch functions.

The PCIe switch 712 may be physically integrated into the FPGA 708 for convenience and/or availability of integrated circuit (IC) area. In other embodiments, however, the PCIe switch 712 may be a separate component or may be integrated into the SSD controller 704. In other embodiments, any number of the components illustrated in FIG. 7 may be integrated on an SOC.

Figure 8:
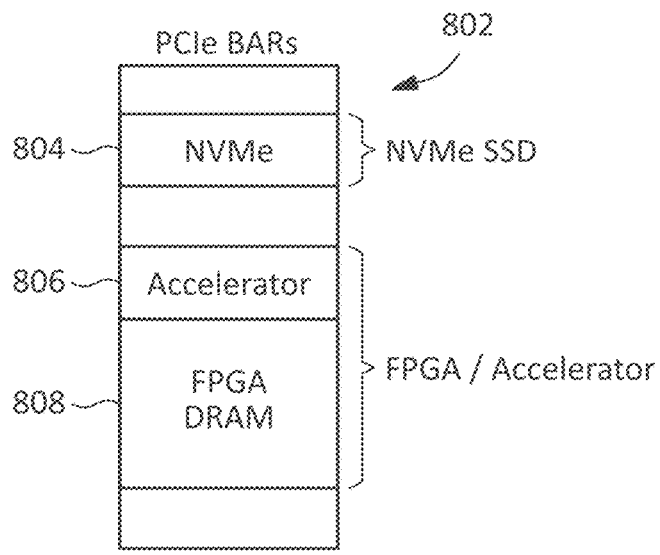
FIG. 8 illustrates a PCIe base address register map that may be used to implement the switching functions of a PCIe switch according to this disclosure.

FIG. 8 illustrates a PCIe base address register (BAR) map that may be used to implement the switching functions of the PCIe switch 712. In the address map 802, an NVMe register address range 804 may support NVMe transfers between the SSD controller 704 and the host 716. An accelerator address range 806 and a DRAM address range 808 may support data transfers between the host 716 and the accelerator 714 and DRAM 710. In some embodiments, the DRAM for the FPGA may be exposed to the host PCIe address space. In some embodiments, NVMe commands may securely stream data between the SSD controller 704 and the FPGA 708 using the P2P connection 728.

The embodiment illustrated in FIG. 7, which may be used to implement any of the shuffle acceleration techniques disclosed herein, may provide enhanced, and in some implementations, unlimited concurrency. In some embodiments, and depending on the implementation details, this configuration may: conserve cache (e.g., L2:DRAM) bandwidth; enable scaling without expensive CPUs at storage nodes; and/or avoid funneling and/or data movement to and/or from standalone accelerators.

Figure 9:
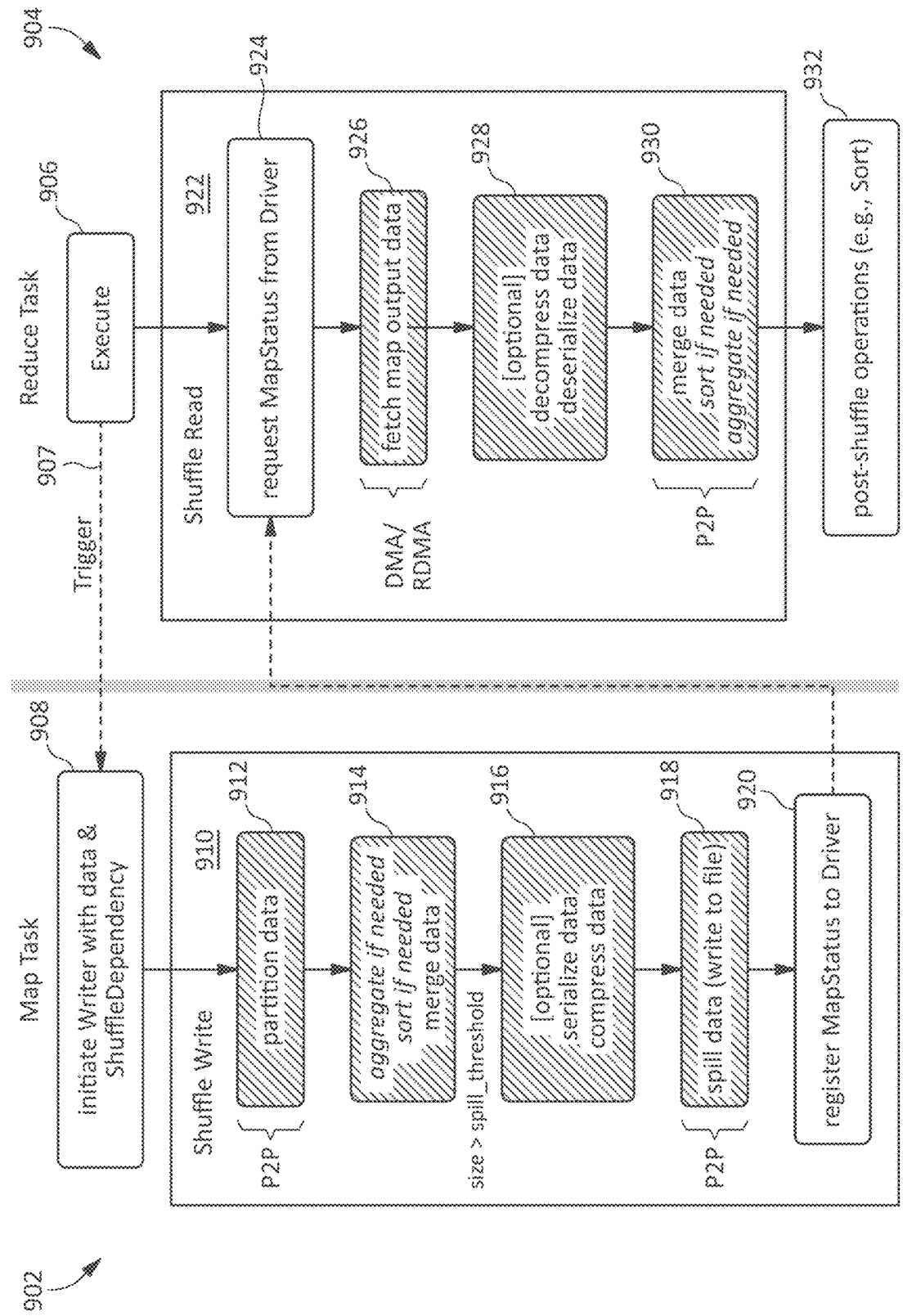
FIG. 9 illustrates an embodiment of a shuffle architecture having shuffle acceleration according to this disclosure.

FIG. 9 illustrates an embodiment of a shuffle architecture having shuffle acceleration according to this disclosure. The embodiment illustrated in FIG. 9 may include a map task 902 including a shuffle write operation 910 and a reduce task 904 including a shuffle read operation 922. These tasks and shuffle operations may include some elements similar to those illustrated in FIG. 2 which may have similar numbers and may operate in a similar manner. However, in the system illustrated in FIG. 9, one or more portions of the shuffle operation, for example, CPU-intensive operations, may be offloaded to an accelerator. In some embodiments, all or part of any of the operations shown with shading may be offloaded to an accelerator, while operations shown without shading may be executed by a CPU. For example, in the shuffle write operation 910, all or part of a data partition operation 912, a data merge operation (which may include a data sort and/or a data aggregation operation) 914, a data serialize and/or data compression operation 916, and/or a data spill operation 918 may be offloaded to an accelerator. As another example, in the shuffle read operation 922, all or part of a fetch operation 926, data decompression and/or data deserialize operation 928 and/or data merge operation (which may include data a sort and/or a data aggregation operation) 930 may be offloaded to an accelerator. Examples of a serialize operation may include converting an object or other data to a bitstream or byte stream for transfer to a storage device. Examples of a deserialize operation may include converting a bitstream or byte stream back to an object or other data after being transferred from a storage device. Serialize and/or deserialize operations may be performed, for example, using serialize/deserialize features in Java, Kryo, and/or the like. In the embodiment illustrated in FIG. 9, and any other embodiments disclosed herein, the labeling of an element as optional does not indicate that other elements are mandatory.

The embodiment illustrated in FIG. 9 may be implemented with any acceleration architecture according to this disclosure including those illustrated in FIGS. 3-8. If implemented with a system having P2P communication between a storage device and the accelerator, any or all of the partition operation 912, the data spill operation 918 and/or the data merge operation 930 may utilize the P2P connection. For example, the data merge operation 918 may write intermediate map output data directly to local storage such as an SSD through the P2P connection rather than using relatively expensive I/O operations with a CPU. As another example, the partition operation 912 may use the P2P connection to write data to local storage as described below. Depending on the implementation details, the use of the P2P connection may increase throughput and/or reduce cost, latency, memory usage, and/or power consumption compared to using relatively expensive I/O operations with a CPU.

The embodiment illustrated in FIG. 9 may also use one or more direct memory access (DMA) techniques. For example, the fetch operation 926 may fetch one or more blocks of map output data based on node, partition, and/or block information using DMA if the data is located within the same node (e.g., in the same storage device, or in a storage device in the same server chassis), or using remote DMA (RDMA) across a network if the data is located at a different node. In some embodiments, and depending on the implementation details, the use of DMA and/or RDMA may increase throughput and/or reduce cost, latency, memory usage, and/or power consumption compared to using a protocol such as TCP/IP across a network and/or I/O operations with a CPU.

Referring again to FIG. 9, once the data blocks are fetched using DMA/RDMA and stored in local storage, the data merge operation 930 may use the private P2P connection to transfer data from local storage (e.g., from an SSD to FPGA DRAM) to merge data and continue executing one or more post-shuffle operations 932, which, in some embodiments, may also be offloaded to an accelerator.

Figure 10:
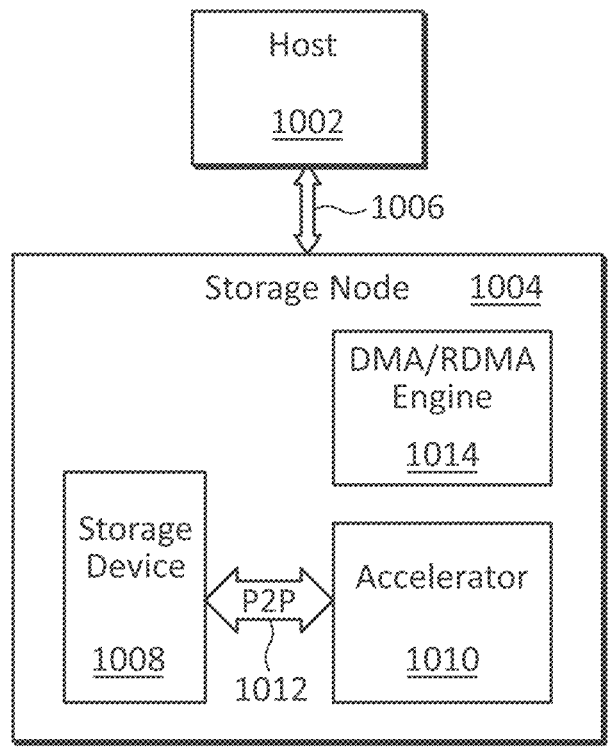
FIG. 10 illustrates an embodiment of a shuffle acceleration system having a P2P connection and a DMA/RDMA engine according to this disclosure.

FIG. 10 illustrates an embodiment of a system having a P2P connection and a DMA/RDMA engine according to this disclosure. The embodiment illustrated in FIG. 10 may include a host 1002, a storage node 1004, a communication interface 1006, a storage device 1008, an accelerator 1010, and a P2P connection 1012 which may be similar to those illustrated in FIG. 4. The embodiment illustrated in FIG. 10, however, may also include a DMA/RDMA engine 1014 which may enable the storage node 1004 to perform DMA transfers, for example, using an interconnect such as PCIe with devices located at the same node. The DMA/RDMA engine may also enable the storage node 1004 to perform RDMA transfers, for example, using a network such as Ethernet with devices located at different nodes.

Figure 11:
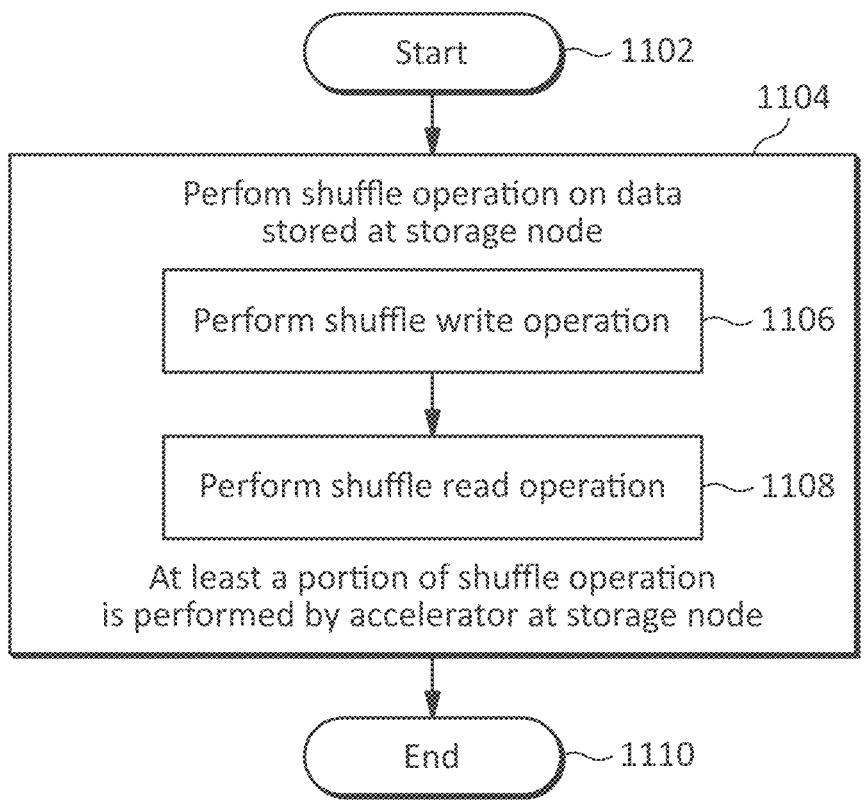
FIG. 11 illustrates an embodiment of a method of processing data in a system having a host and a storage node according to this disclosure.

FIG. 11 illustrates an embodiment of a method of processing data in a system having a host and a storage node according to this disclosure. The method may begin at operation 1102. At operation 1104, the method may perform a shuffle operation on data stored at the storage node. Operation 1104 may include a suboperation 1106, which may include performing a shuffle write operation. Operation 1104 also may include a suboperation 1108, which may include performing a shuffle read operation. In operation 1104, at least a portion of the shuffle operation is performed by an accelerator at the storage node. The method may terminate at operation 1110.

The operations and/or components described with respect to the embodiment illustrated in FIG. 11, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied.

Partitioning Operations

Figure 12:
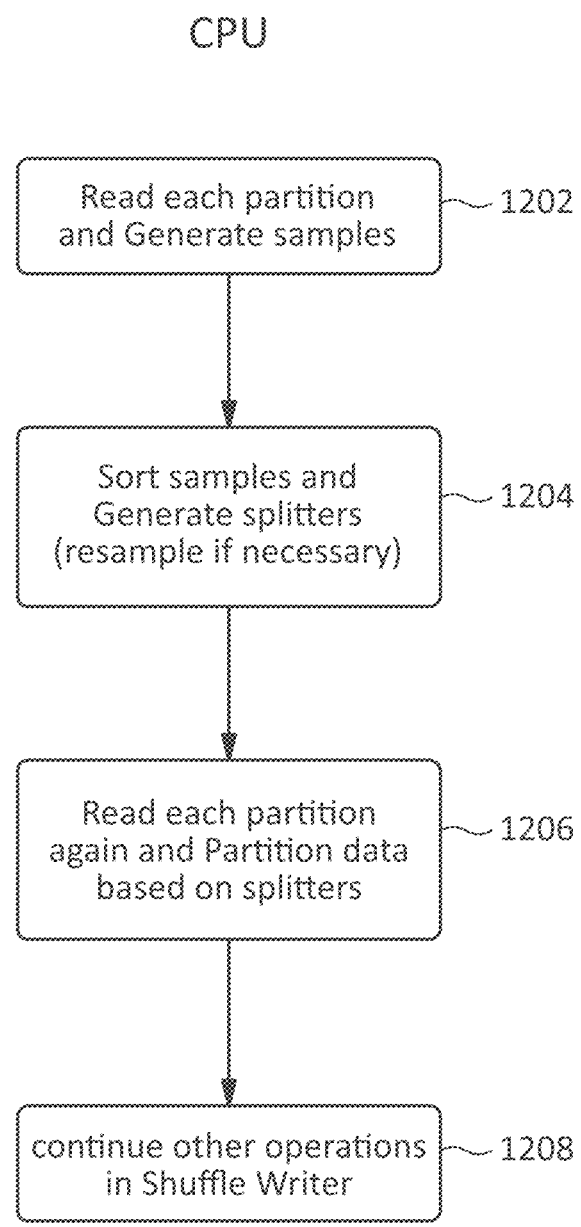
FIG. 12 illustrates an embodiment of a partition operation for a shuffle write operation.

FIG. 12 illustrates an embodiment of a partition operation for a shuffle write operation. In some embodiments, the operation illustrated in FIG. 12 may be performed by a CPU. At operation 1202, the CPU may read each partition and generate data samples for each partition. At operation 1204, the CPU may sort the samples and generate splitters based on the samples. In some cases, partitions may be resampled to generate the splitters. At operation 1206, the CPU may read each partition again and partition the data based on the splitters. At operation 1208, the CPU may continue with other operations in the shuffle write operation.

In some embodiments described above, some offloaded shuffle operations, or portions thereof, may execute concurrently on multiple storage nodes. However, in some embodiments, partitioning may share information which may prevent concurrent execution.

An example embodiment of a range-based partitioning algorithm may proceed as follows: (1) All or some of a dataset may be sampled to obtain K*N samples, where K may be an oversampling factor, which may be any constant value, and N may be the total number of partitions generated after partitioning. (2) An array of K*N samples may be sorted in ascending order. (3) N−1 splitters may be obtained from the sorted K*N samples, for example, by picking a number at every K elements in the array. (4) All or some of the dataset may be partitioned, for example, by directly iterating through the splitters (if N is small), using a binary-search-tree (e.g., if N is large) in a record-by-record fashion, and/or the like.

In some embodiments, a partitioning algorithm may generate evenly-sized partitions for the reducer, thus the sampled data may well represent the entire dataset distribution, which may mean, for example, that the more records reside in a map side partition, the more samples may be generated from that partition. In some applications (e.g., big data applications), data may be distributed among multiple nodes and multiple storage devices. To offload partitioning to an accelerator device while avoiding the overhead to transfer a large amount of data, an embodiment of a workflow design according to this disclosure may reduce or minimize CPU work for coordination.

Figure 13:
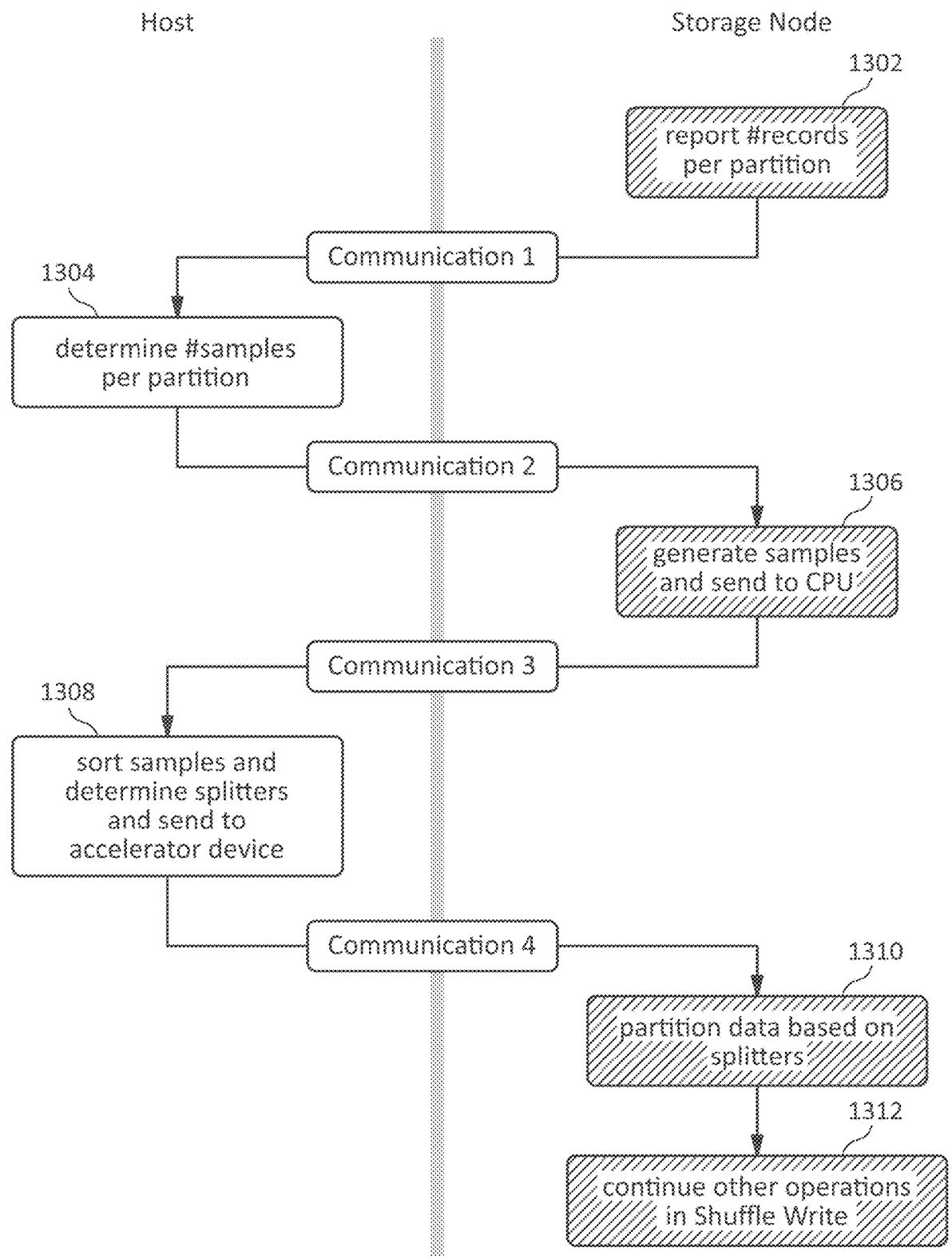
FIG. 13 illustrates an example embodiment of a partitioning workflow architecture according to this disclosure.

FIG. 13 illustrates an example embodiment of a partitioning workflow architecture according to this disclosure. In the embodiment illustrated in FIG. 13, operations performed by a host (e.g., a CPU) are illustrated generally on the left side of the figure, and operations performed at a storage node (which may include an accelerator and/or a P2P connection between the accelerator and a storage device) are shaded and illustrated generally on the right side of the figure and conceptually separated by the shaded bar down the middle of the figure.

At operation 1302, the storage node may determine a number of records for the one or more partitions. The storage node may communicate the number of records to the host at communication 1. At operation 1304, the host may determine the number of samples that should be collected on a per partition basis for one or more of the partitions. The host may communicate the number of samples per partition to the storage node at communication 2. At operation 1306, the storage node may sample data from one or more partitions based on the number of samples determined by the host. The storage node may transfer the sampled data to the host at communication 3. At operation 1308, the host may sort the sampled data and determine one or more splitters based on the sampled data. The host may communicate a set of one or more splitters to the storage node at communication 4. At operation 1310, the storage node may partition the data locally into one or more partitions based on the set of splitters. At operation 1312, the storage node may continue with other steps in a shuffle write operation.

In some embodiments, and depending on the implementation details, the principles illustrated in FIG. 13 may provide any number of the following advantages. First, some CPU-intensive operations such as scanning, binary search, sampling a large dataset, and/or the like, may be offloaded to one or more accelerators, which may lower the CPU utilization. Second, data transfer between a host and a storage node may be reduced or minimized, for example, by communicating relatively small amounts of information such as the size of each partition, the number of samples, and/or the sample data themselves, which may be smaller than the entire dataset. Additionally, in some embodiments, an overall architecture according to FIG. 13 may reduce memory consumption and/or CPU utilization, for example, by efficiently offloading CPU-intensive tasks. Data parallelism in an accelerator may also be properly preserved with reduced or minimum CPU coordination and/or scheduling.

Referring again to FIG. 13, in some embodiments, single nodes (e.g., storage devices) may have multiple partitions. Multiple partitions in a single storage device may be iterated through in a round-robin fashion, for example, controlled by a single CPU thread. In some embodiments, traffic loads (e.g., in communications 1-4) may be smaller compared to scanning all records in all partitions. In some embodiments, one or more nodes may know the number of records for each partition on it, as well as the total number of records across some or all nodes, which may be used, for example, to determine the number of samples to generate for each partition on it proportionally.

The embodiment illustrated in FIG. 13 may be described in the context of a shuffle operation using an accelerator, but the inventive principles may be applied in other applications. For example, the principles illustrated in FIG. 13 may be applied to a sort operation such as an external sort, which may involve sorting a large amount of data that may be stored in one or more storage devices. In such an embodiment, a range partition rule may employ P2P connections between storage devices and accelerators to avoid transferring large amounts of data back-and-forth between the storage devices and a host. In some embodiments, and depending on the implementation details, this may improve parallelism, performance, and/or energy efficiency, and may reduce CPU and/or memory usage and/or network overhead.

As another example, the principles illustrated in FIG. 13 may be applied to range partitioning for a database. For example, one or more tables, which may be the input of one or more database operations, may be partitioned by range, which may be used in a database engine to improve or optimize data storage and/or query performance.

In some embodiments, the principles of this disclosure may provide a generic architecture for shuffle acceleration. Some embodiments may use one or more accelerators (e.g., storage device near-storage computing power) and/or P2P data transfer via a private interconnect between an accelerator device and storage device, as well as utilizing DMA and/or RDMA engines in some implementations to reduce I/O and/or CPU costs. In some embodiments, and depending on the implementation details, a near-storage-accelerated shuffle architecture may provide any number of the following features and/or benefits.

An architecture according to this disclosure may use an enhanced storage device having computational capabilities and/or an accelerator device to accelerate a shuffle operation, which may improve the performance of data-intensive and/or shuffle-intensive applications. Some embodiments may reduce I/O costs, memory consumption, CPU utilization, network overhead and/or the like.

P2P communication between a storage device and accelerator device via private interconnect may improve the scalability of a system, for example, by not overwhelming limited interconnect bandwidth to a host CPU.

Some embodiments may be implemented as a generic shuffle acceleration architecture. As a shuffle operation may be a necessity in some systems, and a bottleneck, for example, in data processing platforms (e.g., big data), some embodiments may have broad prospects in many applications.

In some embodiments, an accelerator device implementation such as an FPGA or application specific integrated circuit (ASIC) may have less power consumption, for example, as compared to a general-purpose processor, which may increase the overall energy efficiency.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple processes, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not to indicate any spatial or temporal order unless apparent otherwise from context. In some embodiments, based on" may refer to "based at least in part on." In some embodiments, "disabled" may refer to "disabled at least in part." A reference to a first thing may not imply the existence of a second thing.

Various organizational aids such as section headings and/or the like may be provided as a convenience, but the subject matter arranged according to these aids and the principles of this disclosure and the embodiments described herein are not defined or limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of processing data, the method comprising:
performing a shuffle operation, wherein the shuffle operation comprises:
performing, at a storage node, at least a portion of a shuffle write operation, wherein the at least a portion of the shuffle write operation comprises storing output data from a map operation at the storage node; and
performing, at the storage node, at least a portion of a shuffle read operation, wherein the at least a portion of the shuffle read operation comprises reading at least a portion of the output data from the map operation at the storage node;
wherein at least a portion of the shuffle operation is performed by an accelerator at the storage node.

2. The method of claim 1, wherein the at least a portion of the shuffle write operation comprises a partition operation.

3. The method of claim 1, wherein the at least a portion of the shuffle write operation comprises one or more of an aggregation operation, a sort operation, a merge operation, a serialize operation, a compression operation, or a spill operation.

4. The method of claim 1, wherein the at least a portion of the shuffle read operation comprises one or more of a fetching operation, a decompression operation, a deserialize operation, a merge operation, a sort operation, or an aggregation operation.

5. The method of claim 1, wherein the at least a portion of the shuffle operation performed at the storage node comprises a partition operation performed using a peer-to-peer (P2P) connection between an accelerator and a storage device at the storage node.

6. The method of claim 1, wherein the portion of the shuffle operation performed at the storage node comprises a data spill operation performed using a P2P connection between the accelerator and a storage device at the storage node.

7. The method of claim 1, wherein the at least a portion of the shuffle operation performed by the accelerator at the storage node comprises a fetch operation performed using a direct memory access operation.

8. The method of claim 1, wherein the at least a portion of the shuffle operation performed by the accelerator at the storage node comprises a data merge operation performed using a P2P connection between the accelerator and a storage device at the storage node.

9. A storage node comprising:
a storage device; and
an accelerator;
wherein the storage node is configured to perform at least a portion of a shuffle operation, the at least a portion of the shuffle operation comprising:
performing, at the storage node, at least a portion of a shuffle write operation, wherein the at least a portion of the shuffle write operation comprises writing output data from a map operation to the storage device; and
performing, at the storage node, at least a portion of a shuffle read operation, wherein the at least a portion of the shuffle read operation comprises reading, from the storage device, at least a portion of the output data from the map operation; and
wherein the storage node is configured to perform at least a portion of the at least a portion of the shuffle operation using the accelerator.

10. The storage node of claim 9, wherein:
the storage node further comprises a peer-to-peer (P2P) connection between the storage device and the accelerator; and
the storage device and the accelerator are configured to perform the at least a portion of the at least a portion of the shuffle operation by transferring data over the P2P connection.

11. The storage node of claim 10, wherein:
the accelerator is integral with the storage device; and
the storage node comprises a server.

12. The storage node of claim 10, wherein the storage device is a first storage device, the accelerator is a first accelerator, the P2P connection is a first P2P connection, and the storage node further comprises:
a second storage device;
a second accelerator; and
a second peer-to-peer (P2P) connection between the second storage device and the second accelerator;
wherein the second storage device and the second accelerator are configured to perform the at least a portion of the at least a portion of the shuffle operation by transferring data over the second P2P connection.

13. The storage node of claim 12, wherein the first and second storage devices are configured to perform the at least a portion of the at least a portion of the shuffle operation by transferring data through a direct memory access operation.

14. The storage node of claim 9, wherein the storage node is configured to perform the at least a portion of the at least a portion of the shuffle operation by transferring data to an additional storage node through a remote direct memory access operation.

15. A method for partitioning data, the method comprising:
sampling, at a device, data from one or more partitions to generate sampled data;
transferring the sampled data from the device to a host;
determining, at the host, one or more splitters based on the sampled data;
communicating the one or more splitters from the host to the device; and
partitioning, at the device, data for the one or more partitions based on the one or more splitters;
wherein the sampling comprises reading a portion of the data from the one or more partitions.

16. The method of claim 15, wherein the sampling is based on a number of samples, the method further comprising:

determining, at the device, a number of records for the one or more partitions;
communicating the number of records for the one or more partitions from the device to the host;
determining, at the host, the number of samples for the one or more partitions; and
communicating the number of samples from the host to the device.

17. The method of claim 15, wherein the sampling is performed by an accelerator at the device.

18. A system comprising:
a storage node comprising an accelerator; and
a host configured to perform a first portion of a shuffle operation
wherein the storage node is configured to perform a second portion of the shuffle operation, the second portion of the shuffle operation comprising:
    performing, at the storage node, at least a portion of a shuffle write operation, wherein the at least a portion of the shuffle write operation comprises writing output data from a map operation at the storage node; and
    performing, at the storage node, at least a portion of a shuffle read operation, wherein the at least a portion of the shuffle read operation comprises reading at least a portion of the output data from the map operation at the storage node; and
wherein the storage node is configured to perform at least a portion of the second portion of the shuffle operation using the accelerator.

* * * * *